United States Patent Office 3,466,306
Patented Sept. 9, 1969

3,466,306
PROCESS FOR THE STABILIZATION OF ORGANIC ESTERS OF PHOSPHORIC ACID
Arthur L. Babson, Morristown, N.J., assignor to Warner-Lambert Pharmaceutical Company, Morris Plains, N.J.
No Drawing. Filed Aug. 6, 1965, Ser. No. 477,962
Int. Cl. C09b *11/08;* C07f *9/02*
U.S. Cl. 260—395
6 Claims

ABSTRACT OF THE DISCLOSURE

A composition of matter useful for the determination of alkaline phosphatase which comprises a phosphate ester or its salts in a solution containing a high concentration of an alkaline buffer, for example, 2-amino-2-methyl-1-propanol or 2-amino-2-methyl-1,3-propanediol.

---

This invention relates to a novel process for the stabilization in aqueous solution of certain organic esters of phosphoric acid. More particularly, this invention relates to a novel process for the stabilization of organic monoesters of phosphoric acid such as phenolphthalein monophosphate, thymolphthalein monophosphate, indoxyl phosphate, phenyl phosphate, p-nitrophenyl phosphate, α-naphthyl phosphate and the like and to stabilized aqueous compositions containing these esters.

The preparation of said phosphoric acid esters such as, for example, phenolphthalein monophosphate is fully described in copending application Ser. No. 400,895, filed Oct. 1, 1964, now U.S. Patent No. 3,331,857. The other esters may be prepared in a fashion analogous to that employed for the preparation of phenolphthalein monophosphate.

These esters may be converted to their corresponding salts by reacting the monoesters with a base such as an amine or an alkali metal hydroxide in a manner as described in said copending application. The resulting salts may also be stabilized by the process of this invention and the process of stabilizing these salts is also included within the scope of the present invention.

Aqueous solutions of the above phosphoric acid ester compounds or their salts are useful as substrates for the determination of the concentration of alkaline phosphatase enzyme in body fluids such as serum. In carrying out procedures for the determination of the alkaline phosphatase enzyme, the phosphate ester or its salt is dissolved in an aqueous buffer solution of tris-hydroxymethylaminomethane of suitable concentration and the solution thus obtained serves as the substrate for the body fluid being tested. The amount of the organic moiety released from the ester during the test period in which the body fluid is incubated with the substrate is a measure of the enzymatic activity of the enzyme on the organic phosphoric acid ester present in the substrate and is directly proportional to the enzyme concentration in the body fluid as described in U.S. Patent No. 2,999,793. The depth of color formed, for example by the free phenolphthalein released into the alkaline medium can be accurately measured.

These phosphate esters such as, for example, p-nitrophenyl phosphate and phenolphthalein monophosphate are normally highly unstable in aqueous solution and can hydrolyze readily to form free p-nitrophenol or phenolphthalein upon standing as a stock solution for any length of time. Obviously, any appreciable degree of hydrolysis is undesirable since the assay by which enzymatic activity or concentration is determined is dependent upon the amount of free p-nitrophenol or phenolphthalein released by the enzyme present. Any excess which may be present due to such hydrolysis will yield an erroneously high reading.

Accordingly, a primary object of this invention is to provide novel buffer systems for aqueous solutions of organic phosphate esters and their salts which will stabilize these phosphate esters or their corresponding salts in the aqueous system employed.

Another object of this invention is to provide an improved buffer for aqueous solutions of said phosphoric acid esters or their salts which is adapted for use in carrying out alkaline phosphatase enzyme assays.

Other objects and advantages of this invention will become more apparent from the following detailed description.

It has now been found that organic esters of phosphoric acid and their salts, for example, phenolphthalein monophosphate or p-nitrophenyl phosphate can be effectively stabilized in aqueous solution with little or no hydrolysis when dissolved in relatively high concentrations in certain novel alkaline buffer systems as described below.

The use of alkaline buffers such as 2-amino-2-methyl-1-propanol at a molar concentration of from 1 to 7 and yielding a pH of 10.2 has been found to be particularly effective in stabilizing aqueous solutions of these phosphoric acid esters and their salts. Thus, for example, when a solution containing phenolphthalein monophosphate dicyclohexylamine salt at a concentration of 20 mg./ml. in a buffer of 2-amino-2-methyl-1-propanol having a molar strength of 3.6 and a pH of 10.2 is incubated under accelerated conditions such as at 45° C. for 11 days and the free phenolphthalein is measured, only trace amounts of free phenolphthalein such as 3.9 gamma can be detected. On the other hand, employing tris-hydroxymethylaminomethylene as the buffer for aqueous solutions of said phosphoric acid ester salt at a molar strength of 4.2, it has been observed that after 11 days' incubation as much as 10.2 gamma of free phenolphthalein can be detected.

Other alkaline buffers which can be employed advantageously in the practice of this invention include, for example, 2-amino-2-methyl-1,3-propanediol.

The pH of the buffer system is not critical but preferably should be maintained at the optimum pH for activity of the alkaline phosphatase enzyme using said aqueous solution of the phosphoric acid ester as the substrate at a pH of from 9.7 to 10.5.

In use, the particular phosphoric acid ester employed is dissolved in a concentration from about 0.01 to 0.1 M in an aqueous solution of the desired buffer which may be at a concentration of about 7.5 M and at a pH of about 10.2. The enzyme source to be assayed, usually a body fluid such as blood serum, is added and the resulting mixture is diluted with water to give a final concentration containing 0.29 M of buffer and about 1.56 mg./ml. of the ester. The mixture is incubated together at 80° F. for about 20 minutes. At the end of the incubation step the enzymatic activity is stopped by the addition of, for example, 0.5 N sodium hydroxide. The color that results from liberation of the organic moiety is stabilized by a second addition of a buffer system having a pH above 11. The developed and stabilized color is then matched against a standard chart as described. The said color chart is developed by matching the color densities of quantitatively determined alkaline phosphatase values against the color densities produced by this test. Thus, a direct reading of alkaline phosphatase concentration is had by use of such a properly calibrated color chart by merely matching the color.

In order to further illustrate the practice of this invention the following examples are given:

EXAMPLE 1

Solutions of phenolphthalein monophosphate dicyclohexylamine salt at three different concentrations are prepared in three different buffers. They are then incubated at 45° C. for 11 days. The solutions are then assayed for free phenolphthalein. The amount of free phenolphthalein liberated per 10 mg. of phenolphthalein monophosphate salt is set forth in the table below for all of the test conditions employed. All buffers are maintained at a pH of 10.2:

|  |  | Initial concentration of phenolphthalein monophosphate | | |
|---|---|---|---|---|
|  |  | 20 mg./ml. | 10 mg./ml. | 5 mg./ml. |
| Buffer | Molarity (M) | Amount of free phenolphthalein detected at the end of 11 days incubation (gamma) | | |
| 2-amino-2-methyl-1-propanol | 7.2 | 2.5 | 3.1 |  |
| Do | 3.6 | 3.9 | 5.8 | 4.8 |
| Do | 1.8 | 6.0 | 7.2 | 9.0 |
| 2-amino-2-methyl-1,3-propanediol | $^1$ 7.0 | 5.3 | 4.2 | 4.1 |
| Do | 3.5 | 5.5 | 7.5 | 8.0 |
| Do | 1.75 | 8.0 | 11.8 | 17.0 |
| Tris-hydroxymethyl aminomethylene. | $^1$ 4.2 | 10.2 | 10.7 | 11.9 |
| Do | 2.1 | 12.7 | 17.3 | 25.9 |
| Do | 1.05 | 13.0 | 20.1 | 37.0 |

$^1$ Saturated.

From the above tabulation, it is apparent that 2-amino-2-methyl-1-propanol and 2-amino-2-methyl-1,3-propanediol are extraordinarily effective in the stabilization of phenolphthalein monophosphate salts.

EXAMPLE 2

Solutions of phenolphthalein monophosphate dicyclohexylamine salt at four different concentrations are prepared employing 2-amino-2-methyl-1-propanediol as the buffer at pH 10.2 and at four different concentrations of said buffer. The buffer concentration range in this example is a multiple of 25× as against 4× in Example 1. The solutions obtained are incubated at 45° C. for 7 days and then assayed for free phenolphthalein as before. The micrograms of free phenolphthalein found per 10 mg. of phenolphthalein monophosphate salt present is given in the table below:

PHENOLPHTHALEIN MONOPHOSPHATE DICYCLOHEXYLAMINE CONCENTRATION

| Buffer molarity | 39 mg./ml. | 7.8 mg./ml. | 3.9 mg./ml. | 1.56 mg./ml. |
|---|---|---|---|---|
| 7.20 | 2.9 | 1.7 | 1.7 | 2.9 |
| 1.44 | 4.9 | 5.2 | 6.0 | 10.9 |
| 0.72 | 5.6 | 7.3 | 10.2 | 16.2 |
| 0.29 | 8.2 | 9.8 | 13.0 | 21.0 |

EXAMPLE 3

Solutions of phenolphthalein monophosphate dicyclohexylamine salt are prepared at a concentration of 7.8 mg./ml. in 0.72 M 2-amino-2-methyl-1-propanol at a pH varying from 9.7–11.15 as set forth below, the solutions are incubated at 45° C. for 8 days and are then assayed for free phenolphthalein as before. The free phenolphthalein found in micrograms per 10 mg. of phenolphthalein monophosphate salt present is shown in the following table.

| Buffer pH: | Micrograms found |
|---|---|
| 11.15 | 5.1 |
| 10.67 | 5.8 |
| 10.46 | 5.6 |
| 10.24 | 6.0 |
| 10.08 | 5.3 |
| 9.74 | 5.6 |

The results observed indicate that the pH is not a critical factor.

It is to be understood that the foregoing detailed description is given merely by way of illustration and that many variations may be made therein without departing from the spirit of my invention.

Having described my invention, what I desire to secure by Letters Patent is:

1. A composition of matter comprising a solution of a phosphate ester selected from the group consisting of phenolphthalein monophosphate, thymolphthalein monophosphate, indoxyl phosphate, phenyl phosphate, p-nitrophenyl phosphate, and α-naphthyl phosphate and the alkali metal and dicyclohexylammonium salts of said phosphate ester and an alkaline buffer selected from the group consisting of 2-amino-2-methyl-1-propanol and 2-amino-2-methyl-1,3-propanediol.

2. A composition according to claim 1 in which said phosphate ester salt is dicyclohexylammonium phenolphthalein monophosphate.

3. A composition according to claim 2 in which said alkaline buffer is 2-amino-2-methyl-1-propanol and the concentration of said buffer varies from 1 to 7.0 M.

4. A composition according to claim 2 in which said alkaline buffer is 2-amino-2-methyl-1,3-propanediol and the concentration of said buffer varies from 1 to 7.0 M.

5. A composition of matter comprising a solution of a member selected from the group consisting of phenolphthalein monophosphate, its alkali metal salt, and its dicyclohexylammonium salt at a concentration of about 0.01 to 1.0 M and 2-amino-2-methyl-1-propanol at a concentration of about 1 to 7 M and having a pH of about 9.7 to 10.5.

6. A composition according to claim 5 wherein said salt of phenolphthalein monophosphate is dicyclohexylammonium phenolphthalein monophosphate.

References Cited

UNITED STATES PATENTS

| 3,331,857 | 7/1967 | Coleman | 260—343.4 |
| 3,331,862 | 7/1967 | Merrill et al. | 260—343.4 |
| 2,999,793 | 9/1961 | Babson | 195—103.5 |
| 3,002,893 | 10/1961 | Babson | 195—103.5 |

DANIEL D. HORWITZ, Primary Examiner

U.S. Cl. X.R.

195—99, 103.5; 260—343.4, 924, 954, 963, 964